DYNAMIC STORAGE ANALOG COMPUTER

Filed March 31, 1961 6 Sheets-Sheet 1

Robert K. Stern
INVENTOR.

BY William R. Sherman

ATTORNEY

Robert K. Stern
INVENTOR.
BY William R. Sherman
ATTORNEY

DYNAMIC STORAGE ANALOG COMPUTER

Filed March 31, 1961 6 Sheets-Sheet 3

Robert K. Stern
INVENTOR.

BY William R. Sherman

ATTORNEY

Robert K. Stern
INVENTOR.

BY William K. Sherman

ATTORNEY

Robert K. Stern
INVENTOR.
BY William R. Sherman
ATTORNEY

Robert K. Stern
INVENTOR.

BY William R. Sherman

ATTORNEY 3,231,722
DYNAMIC STORAGE ANALOG COMPUTER
Robert K. Stern, Point Pleasant, Pa., assignor to Computer Systems, Inc., Monmouth Junction, N.J., a corporation of New York
Filed Mar. 31, 1961, Ser. No. 99,828
7 Claims. (Cl. 235—150.4)

This invention relates to analog computers and more particularly to analog computers employing operational amplifiers in association with storage capacitors for memory or like purposes.

In analog computers, such functions as signal integration and setting in of initial values are commonly performed by computing or operational integrator amplifiers. For such purposes, the integrator amplifier typically includes a high-gain, direct coupled (D.C.) amplifier of single-ended, phase-inverting type. Either by fixed or patch bay connections, a degenerative feedback loop is provided between the output and input terminals of the amplifier, comprising an integrating capacitor. By a similar choice of connections, one or more input resistors have a common junction for applying the sum of a corresponding one or more input signals to the input terminal of the amplifier.

In order that integration of such input signals may be started from an initial value, a relay is arranged to switch the amplifier input from the common junction of such input resistors to the common junction of a feedback resistor and a like-valued initial condition (i.c.) input resistor. The amplifier then responds to the sum of its output voltage and a voltage $E_{i.c.}$ representing the initial value applied to the initial condition input resistor. Because of the high gain inverting action of an operational amplifier, its output is driven into (negative) correspondence with the initial condition voltage $E_{i.c.}$ in the time required for resetting the charge of the capacitor. When the relay couples the regular input signal or signals to the amplifier thereafter, the integration of these signals proceeds from such initial condition value.

In practice, the resetting time for the typical integrator amplifier is so long that use of this technique was generally limited to the beginning of a computing operation. Also, use of initial condition inputs was typically restricted to constant or, at best, slowly varying values, because the long resetting time produced a lag in the correspondence or tracking of the output signal with respect to the initial condition input.

For more versatile application of analog computers, however, it is highly desirable that the resetting capabilities of operational amplifiers arranged as memory units be extended to use in a cyclic or repetitive mode of computer operation, where the repetition rate may range, say from about 50 to 1000 c.p.s. and higher.

At the same time, a portion of the problem set up on the computer may be operated in real time, expanded time, or at a repetition rate typically lower than the foregoing repetition rate. During recurrent cycles in repetitive operation, provision is desirably made for changing from tracking to storing or from storing to tracking at a problem determined time, such time preferably occurring only within one interval of each cycle. The problem-determined time may, for example, occur when a voltage representing a relatively slow varying first function reaches equality with a voltage representing a second function, the latter voltage typically having an iterative characteristic manifested by first values in a reset interval and second values in a succeeding operate interval, per cycle. The equality or comparison ordinarily may be considered to occur in the operate intervals. By utilizing the occurrence of a comparison to determine the instant of acquiring in storage a voltage representing a third function, a wide variety of mathematical functions may be represented, for example. In a given problem setup one or more of such function generating arrangements may be employed, either alone or in conjunction with other types of computing arrangements.

Accordingly, it is an object of the present invention to provide new and improved analog computers arranged for dynamic storage of values.

Another object of the present invention is to provide new and improved analog computers arranged for storage during recurrent intervals of values obtained at an instant during respective preceding intervals.

A further object of the present invention is to provide new and improved analog computers wherein values may be acquired, stored and shifted between successive operational amplifiers during recurrent intervals to perform a variety of computing functions.

Yet another object of the present invention is to provide new and improved analog computers wherein the storage of values may be initiated or terminated at a problem-determined time in successive cycles of operation, each of which includes intervals for acquisition and storage of values.

Still a further object of the present invention is to provide such analog computers wherein the problem-determined time is dependent upon equality of function representing voltages to derive an output voltage varying in prescribed mathematical relation to one or more input voltages.

Yet a further object of the present invention is to provide new and improved analog computers wherein the storage of values may be initiated or terminated at a problem-determined time within a given interval recurring in successive cycles of operation, the condition of storage which is thus initiated, or the condition of tracking which follows termination of storage, being continued into the next succeeding interval of each such cycle.

These and other objects are attained by providing an analog computer with a plurality of operational amplifiers arranged for cascaded connection and each capable of reproducing an input signal and capacitively storing the value thereof during successive intervals. Control means are provided for determining the instant when the input signal has its value stored at the amplifier output. By programming the acquisition and storage of values by successive amplifiers in timed relation (e.g., phase opposition or alternation) the value stored by an amplifier in one interval may correspond with the value stored in a preceding amplifier during a preceding interval, while the preceding amplifier acquires a new value. Provision is made for speedy resetting of the amplifiers so that such intervals may be short, as for purposes of a high rate of periodic repetition.

Acording to the invention, means for programming the acquisition and storage of values includes a voltage comparator having at least one input signal which varies during recurrent intervals and is reset to a prescribed value during alternate intervals. For example, such input signal may vary linearly across the full range of voltages to which the comparator is responsive, once each recurrent interval, and be reset in the alternate intervals to the initial extremity of the range. Hence, in each recurrent interval, the comparator provides a control signal to the control means at the instant when a comparison is obtained between the inputs to the comparator. At such instant, the amplifier input signal is stored at its output. Alternatively for such amplifier or a succeeding amplifier, the stored value may be released at such instant and the output then tracks the amplifier input signal.

In order that such computer may generate voltages varying as a mathematical function of one or more input voltages, at least one slowly varying input signal is applied to the voltage comparator to represent a first function while a second voltage applied thereto, which typically varies across the comparator voltage range, represents the second function. A voltage representing a third function is then applied to the input of the amplifier which has the control signal from the comparator applied to its control means. By having one of the first and third functions or one of the second and third functions a factor of the other, the voltage derived from such amplifier varies as the desired generated function. In this manner, multiplication and division, generation of sines and cosines, arc sines and arc cosines, polynomials and powers with variable roots or exponents may be obtained.

The invention, together with others of its objects and advantages, will be better understood from the following detailed description taken in conjunction with the drawings in which.

Figures 1, 2:
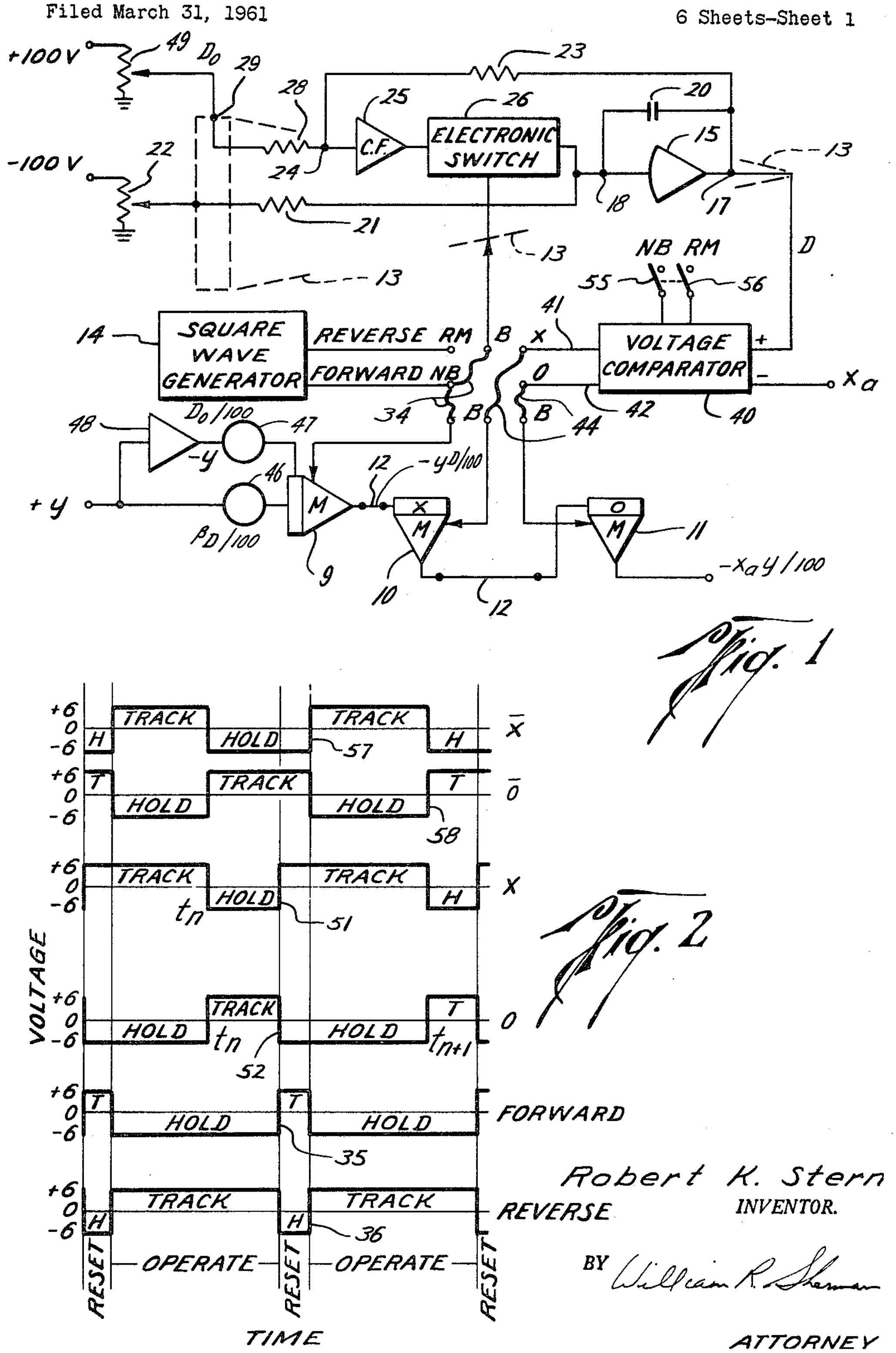
FIG. 1 is a schematic diagram of an analog computing system in accordance with the invention.
FIG. 2 is a graphical representation of the variation of control voltages occurring in the system of FIG. 1.

In FIG. 1 there is shown an analog computer comprising a plurality of operational amplifier memory units 9, 10 and 11 which may conveniently be of identical construction to perform similar memory functions. As shown, the memory units are represented by the conventional symbol for an integrator amplifier but with an "M" in the triangular portion of the symbol to designate the memory function. The components of each such unit may be permanently wired in circuit or, as in a typical general purpose analog computer, some or all terminals of their components may be brought out to a patch bay, switchboard or relay contacts for interconnection (as represented by junction dots) to provide memory units of desired configuration. In the same fashion, the operational amplifier memory units 9, 10 and 11 may have either a permanent cascade connection or preferably may be selectively connected in cascade by patch bay jumpers 12 or the like.

An exemplary form of such memory units is illustrated by the operational amplifier unit 13 which is here employed as an integrator adapted for repetitive or iterative operation.

The analog computer also includes a suitable source of timing waves, such as square wave generator 14, for establishing the cyclic intervals of repetitive or iterative operation. While a single timing wave circuit may be employed, particularly in the embodiments of the invention here illustrated, the exemplary generator 14 is shown to provide outputs designated as "forward" and "reverse" in differently timed relation (e.g., in phase opposition or opposite polarity). The terminals designated NB (normal bus) and RM (reverse memory) may be provided, for example, on a patch board for effecting selective connections with the forward and reverse busses, respectively, of the timing wave generator 14.

Typically, the general purpose analog computer also includes numbers of additional integrator amplifiers, summing amplifiers, multipliers, function generators, and other arithmetic units, and a variety of resistors, capacitors and potentiometers, as well as regulated voltage sources, mode and control switches, and the like with which a variety of problems can be programmed for repetitive or iterative operation, utilizing the novel arrangements of the present invention.

Each of operational amplifier units 9, 10, 11 and 13 includes an operational or computing amplifier 15 which generally is of a high-gain, direct coupled (D.C.), drift-free or drift-stabilized, phase-inverting type, preferably characterized by a wide bandwidth and correspondingly fast rise time for handling dynamically varying signals in high speed repetitive operation.

To provide the memory unit with capacitive signal storage, there is preferably connected between output and input terminals 17, 18 of the amplifier 15 an integrating capacitor 20 having a capacitance of, say, 0.01 microfarad for a 100:1 time speed up, as compared with the usual 1 microfarad. To accommodate input signal integration, provision is made for connection of one or more normal input resistors, such as resistor 21, to input terminal 18 of amplifier 15. Typical values for such input resistors are 100 kilohms or one megohm, depending on the value of capacitor 20 and the gain desired, either permitting application of an input voltage continuously without impairing operation of the integrator memory in accordance with the present invention. As shown, operational amplifier unit 13 has connected with its normal input terminal the tap of a potentiometer 22 across which is applied a reference input voltage, for example, −100 volts where the limits of computer voltage excursions are −100 volts to +100 volts. As a matter of convention, a normal input to the amplifier unit is represented by a lead line terminating on the side of the symbol which parallels the base of the triangle, multiple inputs being represented by parallel lead lines extending from this side. As will be described subsequently, such a lead line is associated with computing unit 9. For some iterative programming of problems, voltages may be applied to the input resistor 21 of one or the other of units 10, 11. Typically, however, their normal input resistors may remain unused and unconnected.

The integrating capacitor 20 is thus arranged in a first feedback loop around amplifier 15 for relatively drift-free signal storage. There is further provided a second feedback loop which includes a feedback impedance or resistor 23 connected between amplifier output terminal 17 and a summing point 24 in the loop. Such summing point is, for purposes of the present invention, connected to the input terminal 18 for the amplifier via means which provides not only an impedance transformation or step-down but also a connection which is selectively operative so that the second feedback loop may be alternatively incomplete and completed in an operative sense. Since both of the feedback loops are required to be degenerative, this being true of the first feedback loop by virtue of the inverting action of amplifier 15, the means connected between summing point 24 and input terminal 18 desirably effects zero or an even number of phase reversals.

To exemplify such means, there are shown an impedance transforming amplifier 25 and high speed or electronic switch 26 conveniently coupled in that order between summing point 24 and terminal 18. Amplifier 25, in a preferred form, incorporates a gain stabilized cathode follower or emitter follower providing the desired transformation between a high impedance input and a low impedance output with unity voltage gain, an output impedance of a fraction of an ohm to, say, 50 ohms being exemplary. The connection of output current from this low impedance source is conveniently controlled by utilizing triodes, discharge-type or solid state diodes, transistors or the like in any suitable switching configuration which substantially interrupts current to the amplifier input 18 in the OFF condition and connects such current with minimum drift and attenuation in the ON condition. Of course, the impedance transforming and switching functions may be combined, as in a gated amplifier, or reversed in order, or otherwise provided for in a variety of ways while serving the purposes of the present invention. Also, a mechanical switch or relay may be employed although generally not susceptible to as high speed operation as may be desired.

To couple an input signal into the memory unit 9, 10, 11 or 13, a memory input resistor 28 is provided, connected between input terminal 29 of the memory unit and summing point 24 and having a value preferably equal to or a multiple or submultiple of the resistance value of feedback resistor 23. For example, each may be 100 kilohms. To distinguish from the normal input resistor 21, the memory input resistor 28 is sometimes referred to as the reset or initial condition input resistor. The overall configuraton of the computing amplifier 15 with feedback capacitor 20 and resistor 23 and memory input resistor 28 may be recognized as a so-called lag summer modified, however, by the presence of amplifier and switching means 25, 26.

To utilize these means in accordance with the present invention, a timing wave from square wave generator 14 is applied via the forward bus and patch bay terminal NB to the control input patch bay terminal B for the electronic switch 26 of the integrator amplifier unit 13, utilizing patch bay jumper 34. Where the electronic switch is adapted for changing between its OFF and ON conditions by a transition in the timing wave from, say, a negative six volts to a positive six volts, the timing wave may have a form typified by the curve 35. For purposes of comparison, the curve 36 is also shown to illustrate a typical wave form on the reverse bus. The particular wave form and amplitude excursions are, of course, properly determined by the requirements for actuating switch 26. In FIG. 2, the timing waves 35, 36 have a square wave form of alternate polarity defining recurrent first and second intervals occurring in alternate sequence during successive cycles. The intervals are designated in connection with curve 35 (forward bus) as a relatively short reset (first) interval and a relatively long operate (second) interval, such designations being adopted by closest analogy to the terms employed heretofore in the analog computer art. In the reset interval, the positive gating voltage is applied via the forward bus to electronic switch 26 for a sufficient time to insure resetting of its output voltage at terminal 17 to the voltage applied at the memory input terminal 29, e.g., +100 volts. The gating voltage of opposite polarity is applied to unit 13 during the succeeding, longer operate interval. As explained hereafter, application of this control signal, together with the fixed voltage input signals, results in an output wave form of sawtooth configuration, including a ramp increasing from a −100 volts obtained during the reset interval, linearly through the duration of an operate interval to the other limit, e.g., +100 volts. Such repetitive ramp voltage may be representative of an independent variable D.

In further accord with the present invention, means are provided for deriving a control signal at an instant of time which may vary within one of the recurrent intervals, preferably the operate interval, for switching one or more memory units between its holding and tracking modes. Preferably, however, such means provides at least two control signals so that the mode switching of successive memory units may be in differently timed relation. To exemplify such means, there is shown in FIG. 1 a voltage comparator 40 having a pair of inputs + and −, as well as a pair of outputs illustrated by busses 41 and 42 connecting with terminals "X" and "O". While the voltage comparator 40 may have a variety of forms suitable for practice of the present invention, a preferred form is described hereafter in conjunction with FIG. 4. In summary, however, the comparator may be responsive to the difference between the voltages applied at the + and − input terminals (with respect to ground) to provide a +6 volt output at the X terminal when the input voltage applied to the positive terminal is algebraically less than the input voltage applied to the minus terminal, at the same time applying a −6 volt output to the O terminal. Conversely, at the instant when the input voltage applied to the plus terminal exceeds that applied to the minus terminal, the output voltage at the X terminal switches to a −6 volts and that at output terminal O switches to a +6 volts. Of course, like the timing waves from square wave generator 14, the output from voltage comparator is of a form, magnitude and polarity adapted for actuation of electronic switch 26. The exemplary voltages given as applied at the output terminals X and O are seen to correspond in magnitude with the successive +6 and −6 voltages of the timing wave at forward terminal NB.

To exemplify a specific application of the voltage comparator 40, its − input terminal is connected to the source of a voltage $x_a$, such voltage varying relatively slowly in comparison with the repetition rate established by the square wave generator 14 and representing a first function, or more particularly, a first independent variable input. The input $x_a$ may vary continuously in real time or may be derived, for example, from an amplifier unit operating in the repetitive mode but at a frequency substantially lower than the repetitive operation frequency of the amplifier units 9 and 13. The output voltage derived from amplifier unit 13 and applied to the + input terminal of the comparator is, during each operate interval, variable over the full range of the comparator, as indicated by straight line D in FIG. 3. Note that the variable input $x_a$ is shown as a constant valued straight line since the sampling frequency is much greater than the frequency at which $x_a$ is varying. The respective output terminals X and O of the comparator are connected by patch board jumpers 44 selectively to the control signal input terminals B of memory units 10 and 11, correspondingly designated "X" and "O."

While the invention may be exemplified by application of the control signals from the comparator to one of the X and O memories 10 and 11, in a practical application of the invention to four-quadrant multiplication, the memory units 10 and 11 are driven as X and O memories, respectfully, by the output of memory unit 9. The memory unit 9 has its control input terminal B connected by patch board jumper 34 to the forward timing wave terminal NB so as to be programmed in sychronism with amplifier unit 13. It may be noted here that forward memory unit 9 carries no designation in the rectangular portion of the symbol, and this is to differentiate it from the X and O memory units and to indicate that it has a control input connection to terminal NB of the timing wave generator 14. Further, the absence of a numeral indicates that any signal applied to its normal input is applied with unity gain. Connection to terminal RM would be represented by "REV" in the rectangle.

In the present case, the normal input terminal is connected to the tap of a potentiometer 46 across which is applied a second input voltage $y$. The memory input terminal, likewise, is connected to the tap of potentiometer 47 across which, however, is applied the negative of the input voltage $-y$ derived from inverter 48, a unity gain operational amplifier affording a sign inversion. Similarly to provide an initial condition input for the integrating amplifier unit 13, its memory input terminal 29 is connected to the tap of a potentiometer 49 across which is applied a reference voltage of +100 volts.

To exemplify a typical operation of the apparatus of FIG. 1, attainment of an output voltage from O memory unit 11 proportional to the product of the two slowly varying inputs $x_a$ and $y$ is dependent upon establishing substantially identical integration rates in the amplifier units 9 and 13 during each operate interval. By so doing, the amplifier unit 9 generates a ramp function proportional to $y$D, where D is the ramp function derived from amplifier unit 13. This assumes, of course, that the inputs $x_a$ and $y$ have values varying continuously or in recurrent intervals at a rate which is slow with respect to the repetitive operation rate established by the square wave generator 14. However, since the repetitive operation rate may be relatively high, for example, between 50 and 100 c.p.s. and higher, rates of input signal variation may be accommodated which have no counterpart in prior art practice.

Figure 3:
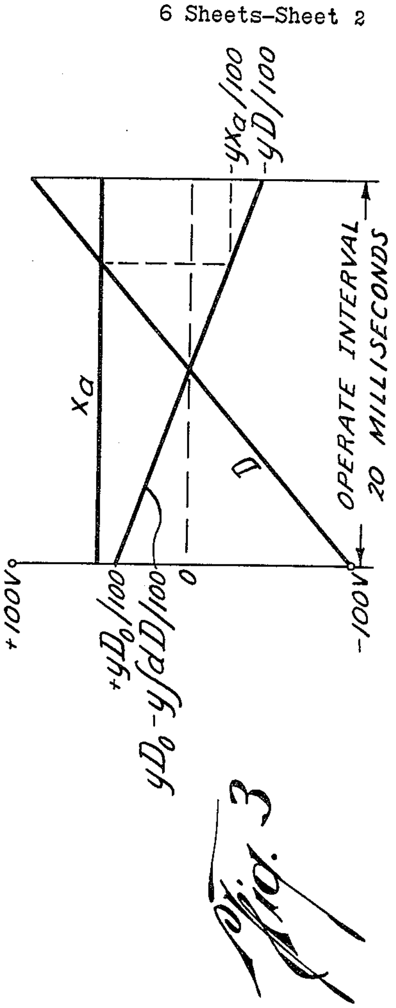
FIG. 3 is a graphical representation of the variation of voltages occurring in a typical operate interval, in the system of FIG. 1.

To render the rate of integration of amplifier units 13 and 9 identical and to insure that the actual voltages derived from them at any given instant are related to one another by the factor D, the potentiometers 22 and 46 are set in accordance with the integration rate $\beta_D/100$ and each of the potentiometers 47 and 49 is set at $D_0/100$ to introduce the initial value $D_o$, which may be 100 volts, if desired. Taking account of the sign inversion, then, the ramp D of FIG. 3 is derived at the output of amplifier unit 13 and a ramp $-yD/100$ is derived from the output of amplifier unit 9, represented in FIG. 3 by the expression $yD_0-y\int dD/100$. It may be observed that the respective ramps are at zero voltage at the same instant and, at the instant when the ramp D equals $x_a$, the ramp $-yD/100$ has the value $-yx_a/100$, that is, the desired output representing multiplication of inputs $x_a$ and $y$.

To achieve this result, the memory units 9 and 13 have their switches 26 closed by the +6 volts of the timing wave on the forward bus during each reset interval, whereupon the amplifier units operating as high speed lag summers drive the output voltages into correspondence with the respective memory input voltages. When the timing wave 35 subsequently switches to a −6 volts in the succeeding operate interval, the amplifier units initially have such output voltages stored by the charge remaining on integrating capacitor 20. However, in response to the normal input voltages, the corresponding operational amplifiers 15 charge their feedback capacitors in a manner of an integrator amplifier to obtain a variation in output voltage representing the integral of the normal input voltage. Thus, while the output voltages of the amplifier units 13 and 9 are represented respectively by ramps D and $yD/100$ of FIG. 3 during each operate interval, the output of each during the successive reset intervals is determined by the initial value $D_o$ (−100 volts) and, in the case of memory unit 9, is $+yD_0/100$. In other words, with reference to the operate intervals illustrated in FIG. 3, each amplifier unit provides an output voltage during the preceding reset interval which is effectively constant at the initial value of the corresponding ramp and, at the termination of such operate interval, is reset to the same respective values, that is, −100 volts and $+yD_o/100$.

In order to determine the value of the ramp $-yD/100$ at the instant when the ramp D equals the input $x_a$, the voltage comparator 40 is arranged with the voltages $x_a$ and D applied respectively to − and + input terminals to give a positive 6 volts at its X terminal so long as D is less than $x_a$ and to give a negative 6 volts at such terminal from the instant when D exceeds $x_a$. At such instant of time $t_n$, the X memory unit 10 switches from a tracking mode with its electronic switch 26 closing the second feedback loop from the summing point 24 to the amplifier input terminal 18, to the holding mode with switch 26 open. During the tracking mode, the X memory unit acts as a lag summer to reproduce at its output a voltage equal to the input $-yD/100$ but of opposite sign. At the instant $t_n$ when D equals $x_a$, the X memory unit 10 stores the acquired value $+yx_a/100$ equal in magnitude but of opposite sign with respect to the voltage then applied at its memory input terminal. During the succeeding reset interval, the input to the plus terminal of the voltage comparator drops again to $-D_o$ or −100 volts, assuring that the output of the voltage comparator is switched back to a +6 volts on the X terminal whereby the X memory unit is restored to the tracking mode. The output of the X memory unit 10 while tracking during the reset interval is, of course, $+yD_o/100$.

The purpose of the O memory unit which is programmed by a control signal having a complementary waveform 52, the negative of the X waveform 51, is to acquire the output voltage $+yx_a/100$ of the X memory unit 10 during each operate interval following the comparison, and to hold such output voltage available with an opposite polarity through the succeeding reset interval and a portion of the next following operate cycle to the instant $t_{n+1}$ at which the next comparison is effected. In this manner the value stored at the output of O memory unit 11 in one interval may correspond with the value stored in the preceding memory unit 10 during the preceding interval, leaving the X memory unit free to acquire a new value while the prior solution remains available. Because of the high accuracy attainable with the operational amplifier units and the speedy response characterizing the fast reset and high repetitive rates, the multiplication accomplished by the analog computer of FIG. 1 is highly accurate and adaptable to multiplication of relatively quick varying inputs. Moreover, it will be evident that the inputs may be of any polarity, so that four-quadrant multiplication is attained. If the input $x_a$ varies as one function, the voltage D as a second function and the voltage applied to the memory input of the X memory unit 10 as a third function, it is seen that the second function, being a variable of the third function, makes possible obtaining an output from the X memory unit representing a substitution of the first function for the second function at the instant of their equality.

More generally, it may be said of the computer arrangement according to the present invention that, if one of the first and third functions or one of the second and third functions is a function of the other, the instant of comparison or equality may be utilized to obtain an output representing the substitution of the first function for the second or vice versa.

While the controlled integration rates may be utilized to obtain this functional relationshp, it will be noted that the invention broadly comprehends the employment of a plurality of amplifier units, each with two modes of operation, one or more of which are switched between operating modes by a periodic control signal and another one or more of which is switched by a control signal which is alternately periodic and aperiodic. In some instances, the advantages of repetitve operation may be obtained, in accordance with the invention, solely through use of amplifier units responsive to the latter type control signal, with various arrangements being utilized to determine the instant of occurrence of the aperiodic portions of the control signal.

It may be observed, of course, that the problem solution represented in FIG. 1 is of a very simple character compared with that to which the practice of the invention may be applied. Other suitable applications can, of course, be made for utilizing the control signal developed from the voltage comparator when there is applied to it a voltage having a predetermined value in the reset intervals and changing monotonically through the operate intervals. While typically a comparison is obtained in each cycle, it is conceivable that the comparator may be employed in problems where no comparison occurs in some cycles.

It may be recalled that the invention is particularly well adapted for incorporation in a general purpose analog computer wherein separate, elaborate multipliers have heretofore been incorporated. In accordance with the present invention, the amplifier units and other components of the general purpose analog computer may be hooked up whenever desired to provide equally effective or superior multiplication characteristics without the requirement of specialized multipliers. In a similar fashion, the computer arrangements described hereafter may be obtained by suitable patch board connections, etc., utilizing a general purpose computer.

While not employed in the particular problem setup in FIG. 1, the voltage comparator 40 conveniently is provided with a pair of input switches 55, 56 for selective connection of correspondng inputs to the respective timing wave terminals NB and RM. While the effect of closing switches 55 and 56 will be understood better in connection with the description of the voltage comparator of FIG. 4, it may be said here that the effect is to change the output waves at the X and O terminals to the waveforms illustrated respectively by curves 57 and 58 of FIG. 2. When these waveforms are applied to the memory units 10 and 11, they are characterized as extended X ($\overline{X}$) and extended O ($\overline{O}$) memories which, upon a comparison, are switched from one mode (hold or track) to the second during the operate intervals and remain in such mode during the succeeding reset intervals.

Figure 4:
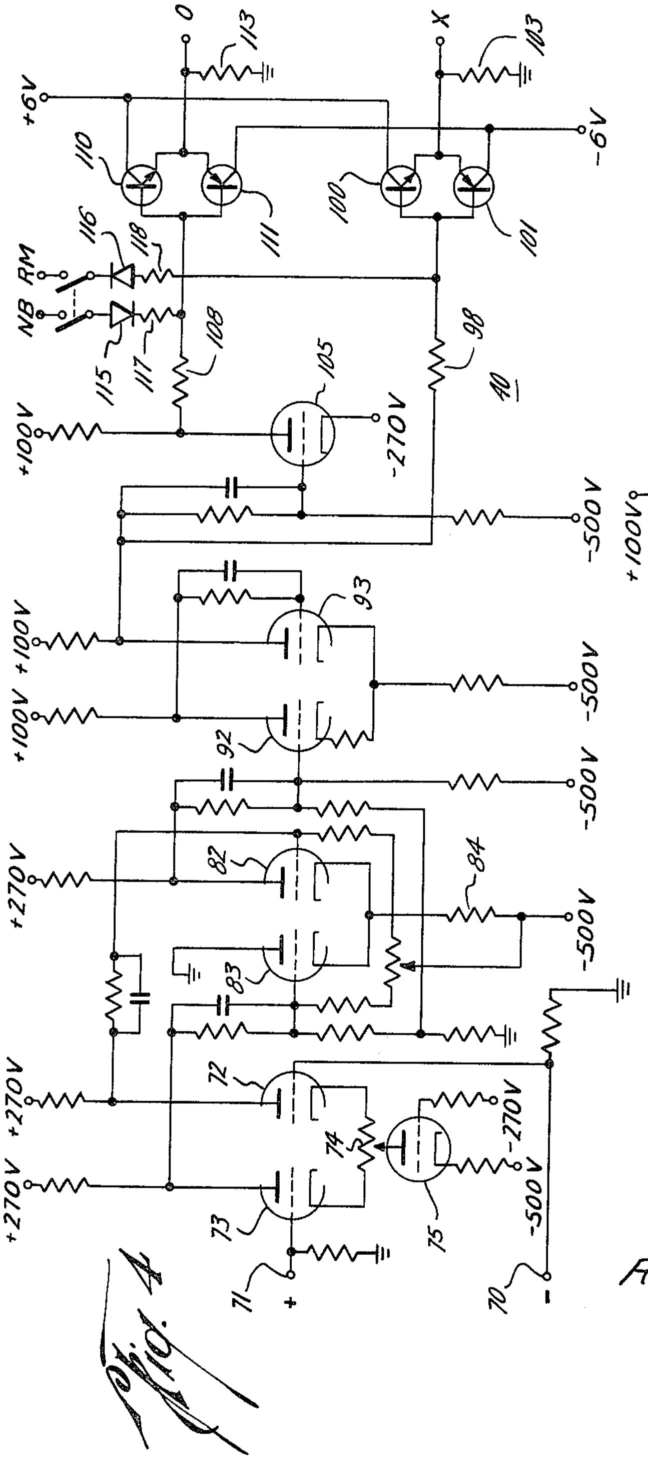
FIG. 4 is a circuit diagram of a voltage comparator suitable for use in the analog computing system of FIG. 1.

Turning now to the voltage comparator of FIG. 4, the exemplary circuit is seen to include and + terminals 70, 71 coupled, if desired, by appropriate grid resistors (not shown) to the respective control grids of triodes 72, 73 having their cathodes connected through balance potentiometer 74 to a source 75 of a low positive bias voltage. The respective outputs of triodes 72 and 73 are separately coupled to grids of triodes 82, 83 having a common cathode connection to cathode resistor 84, the plate of triode 83 being grounded so as to obtain a single-ended output from the plate of triode 82. For further amplification, such output is coupled to the grid of triode 92, the plate of which is in turn coupled to the grid of triode 93.

To obtain the desired output wave form at the X terminal, the output from triode 93 has a common connection via resistor 98 to the bases of transistors 100, 101 which together provide means for selectively switching to the X terminal the positive or negative polarity of the voltage applied to the terminals across which the transistors are serially connected. Where the desired wave form at the X terminal, as determined from the requirements of the electronic switch 26 (FIG. 1), shifts between plus and minus six volts, substantially the same voltages are applied via such opposite polarity terminals to the collectors of the respective transistors. The common junction of the emitters may be connected directly to the X terminal and via a suitable valued resistor 103 to ground. Since the transistors 100 and 101 are, respectively, of an NPN and a PNP type, they serve to apply the positive six volts to the X terminal when their bases are driven positive and, conversely, to apply the minus six volts to the X terminal when their bases are driven negatively by triode 93.

In order that a complementary waveform (curve 52 of FIG. 2) may be obtained at the O terminal, the output of triode 93 is coupled to the grid of an inverting stage comprising triode 105, the plate of which is in turn coupled via resistor 108 to the common junction of the bases of transistors 110 and 111. Transistors 110 and 111 may be identical to the respective transistors 100 and 101 and have identical connections, except for connection of their common emitter junction to the O terminal as well as via resistor 113 to ground.

In operation, so long as the voltage applied at the − terminal 70 algebraically exceeds the voltage applied to the + terminal 71, the output from triode 93 is positive and serves to switch the +6 volts to the X terminal. At the same time, the output from inverter stage 105 is negative and serves to switch to the O terminal the −6 volts. A comparison, of course, occurs at the instant when the voltage applied to the + terminal becomes more positive than that applied to the − terminal. At such time, the polarity of the outputs from triodes 93 and 105 become, respectively, negative and positive, thus reversing the switching action of the transistors and causing a −6 volts to appear at terminal X and a +6 volts to appear at terminal O. Subsequently, whenever the voltage applied at the + terminal drops below that applied to the − terminal, as when the output of the integrator unit 13 is reset to a −100 volts during each reset interval, the polarities at the X and O terminals are switched back again.

For purposes of obtaining extended X and O memories, switches 55 and 56 are closed, so that the timing waves 35, 36 at terminals NB and RM representing the forward and reverse outputs, respectively, of the square wave generator are coupled via oppositely poled diodes 115, 116 and coupling resistors 117, 118 respectively to the common base junctions of the transistor pairs 100, 101 and 110, 111. As may be seen with reference to the curves of FIG. 2, application of a minus six volts at the reverse terminal RM during each reset interval assures a negative voltage output at the X terminal to maintain the X memory unit in its hold condition. Correspondingly, application of a positive six volts at the NB terminal assures a positive six volts at the O terminal, so that the O memory continues in the tracking mode. By suitably proportioning resistors 108, 117 and 98, 118, the voltages applied via the NB and RN terminals, when switches 55 and 56 are closed, are caused to override voltages derived from the amplification stages of the comparator.

Figure 5:
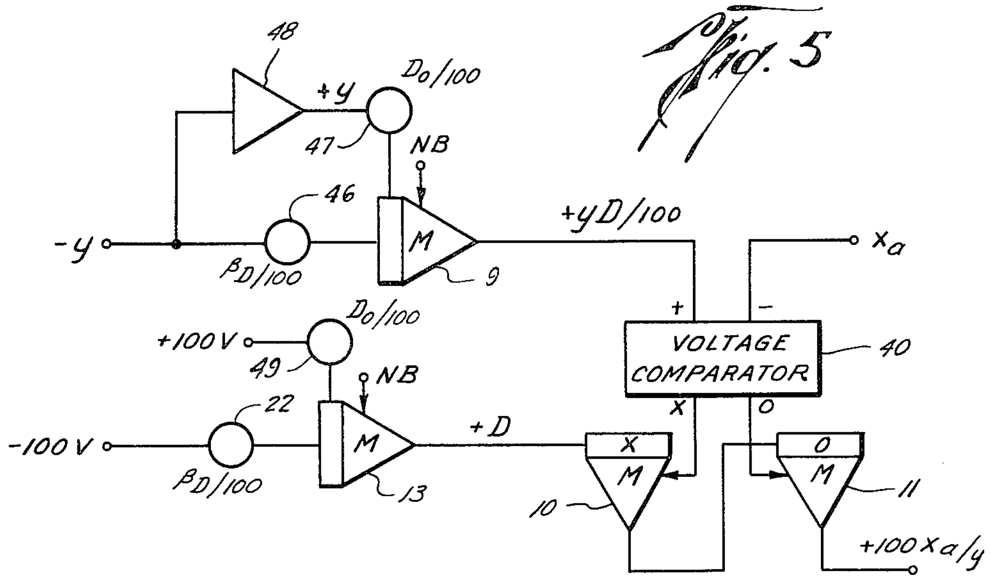
FIG. 5 is a schematic diagram of an analog computing system for two-quadrant division.

Turning now to the embodiment of FIG. 5, substantially the same computer arrangement as that of FIG. 1 may be employed to obtain two-quadrant division. To obtain an output from the memory circuits 10, 11 representing a quotient, rather than a product, the inverter 48 is connected between the input to the potentiometer 46 and the input to the potentiometer 47 to apply to the latter the opposite $+y$ of the voltage $-y$ applied to the potentiometer 46, to provide a ramp $+yD/100$ from the ouput of memory unit 9 to the plus input terminal of comparator 40, thus making the instant of comparison determined by the comparator 40 dependent on equality of its inputs $x_a$ and $+yD/100$. The reference voltages −100 volts are then applied respectively to the normal input potentiometer 22 and the memory input potentiometer 49 for forward memory unit 13. The output +D from memory unit 13 which is tracked by the X memory unit 10 therefore has a value at the instant of comparison equal to $+100x_a/y$, with the sign of the corresponding output of the memory unit 10 being reversed or negative. The output acquired by the O memory unit 11 is then $+100x_a/y$. More detailed aspects of the operation of the circuit of FIG. 5 will be understood from the corresponding discussion of the multiplier of FIG. 1.

A highly desirable feature of the dividing circuit of FIG. 5 is its ability to divide by zero. If the $y$ input were to pass through zero, the output quotient would simply rise to the maximum machine value, e.g., 100 volts, without causing any overload or circuit instability. If the quotient is defined by L'Hospital's rule at zero, the correct value may then be determined. Also, it may again be observed that the quotient is responsive to sign changes of the input $x_a$ correctly to afford two-quadrant division.

Figure 6:
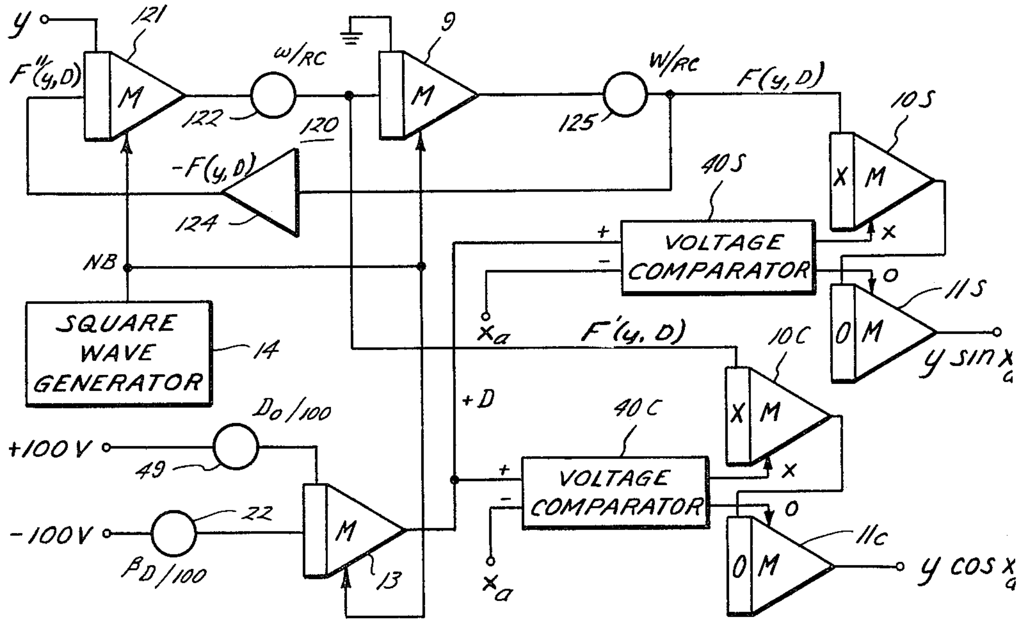
FIG. 6 is a schematic diagram of an analog computing system arranged for generating sines and cosines.

With the analog computing system of the present invention arranged in accordance with the configuration of FIG. 6, both the sine and cosine functions are obtained. Here the forward memory unit 13 is employed, just as was memory unit 13 in FIG. 1 and memory unit 13 in FIG. 5, to generate a ramp +D (see FIG. 3). For simultaneous generation of a sine and a cosine function, two groups of voltage comparator and X and O memory units are utilized which are conveniently distinguished by "*s*" and "*c*," otherwise being identical preferably. While the ramp +D is applied to the + input terminals of voltage comparators **40*s* and 40*c* and the input variable voltage $x_a$ applied to the — input terminals, the memory circuits are supplied, respectively, with a voltage $+F(y,D)=y \sin D$ and $F'(y,D)=y \cos D$. Hence, at the instant of comparison $D=x_a$ and the outputs are respectively $y \sin x_a$ and $y \cos x_a$. With the inputs $x_a$ the same, the common comparator 40** may be used.

In order to generate the sine and cosine functions F(y,D) and F'(y,D) use is made of a closed loop circuit 120 associated with memory unit 9 and adapted to oscillate at a frequency $\omega$ preferably such that a complete cycle corresponds with the duration of the operate interval. To this end, a forward memory unit 121 with the variable input *y* applied to its memory input delivers a voltage to frequency adjusting potentiometer 122 at the normal input of memory unit 9. The tap of the potentiometer 122, in addition to being connected to the normal input of memory unit 9, is also connected to the memory input of X memory unit **10*c* connected, as usual, in cascade with O memory unit 11*c*. Forward memory unit 9, in addition to having its memory input grounded, has its output connected both to the memory input of X memory unit 10*s* (for the sine output) and also to the input of inverter 124, via frequency determining potentiometer 125, the output of inverter 124 thence being coupled to the normal input of forward memory unit 121**.

With the loop circuit 120 so completed and the potentiometers 122 and 125 adjusted to give unity loop gain at the desired frequency, the forward memory unit 121 introduces the variable input *y* as an initial condition and delivers an output voltage which, when multiplied by the factor $\omega$/RC set in the potentiometer 122, yields the voltage $y \cos D$. Upon comparison, the X memory unit **10*c* acquires the voltage $y \cos x_a$ and such voltage is made available for readout at the output of the succeeding O memory unit 11*c* in the next cycle. Since the negative of the integral of $y \cos D$ is $y \sin D$, a voltage $y \sin x_a$ representing this function is available during the operate intervals, at and after the instant of comparison, from the output of forward memory unit 9 and accordingly the voltage $y \sin x_a$ is available for readout from the O memory unit 11*s*. During the alternate reset intervals, the output of forward memory unit 9 is reset to zero to avoid introducing a further initial condition than that provided by forward memory unit 121**, i.e., the input *y*.

Thus, the circuit of FIG. 6 provides for tracking of trigonometric functions by X memory units and their acquisition and storage at times representing evaluation in accordance with the variable $x_a$, by the O memory units. With the frequency of the timing wave from square wave generator 14 adjustable, sampling rates for the inputs $x_a$ and *y* may be adjustable, say, from 0.1 to 2000 samples per second. It may be noted that potentiometer 49 should be adjusted for zero phase shift under all operating conditions, such that the starting time of the ramp D from memory unit 13 coincides with the start of the sine and cosine functions from memory units 9 and 121.

Figure 7:
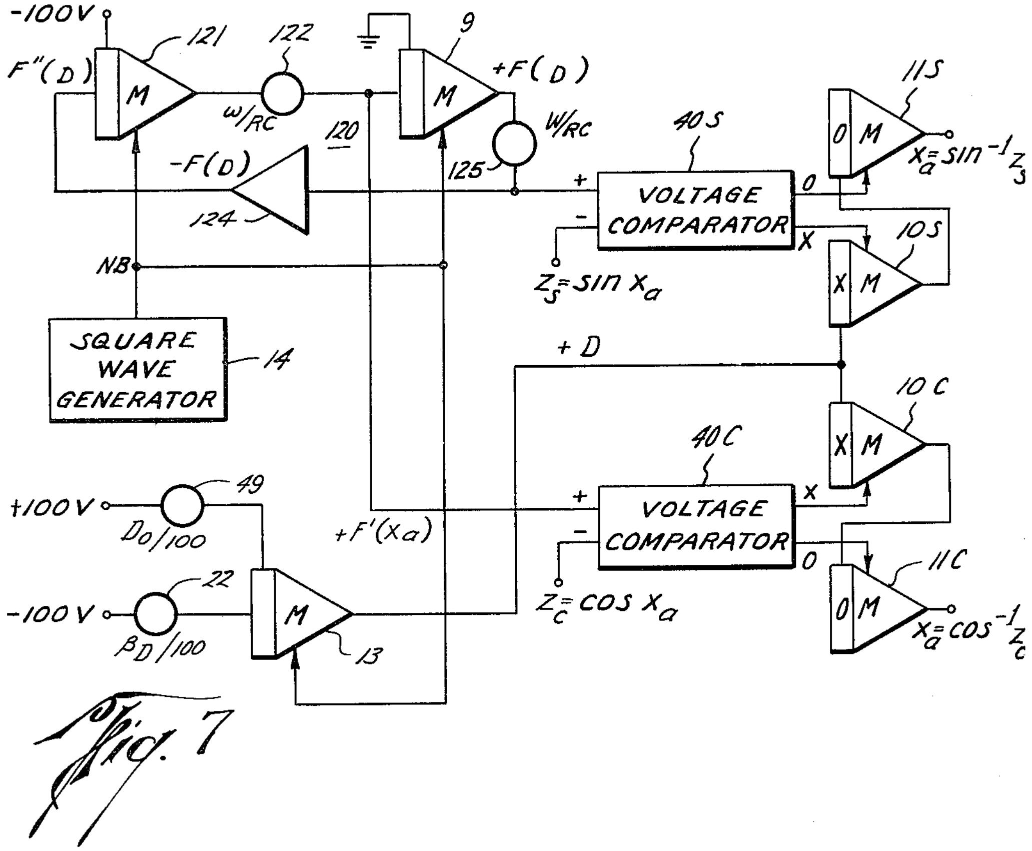
FIG. 7 is a schematic diagram of an analog computing system arranged for generating arc sines and arc cosines.

As in the case of multiplication and division, the inverse of the trigonometric functions generated by the circuit of FIG. 6 may be obtained by applying the trigonometric functions to the comparators and the ramp D to the X and O memory units, as shown in FIG. 7. The circuitry here is essentially the same except that a −100 volts is applied to the memory input of memory unit 121 and the input and output of memory unit 9 are connected to the respective + input terminals of voltage comparators **40*c* and 40*s*. The output of forward memory unit 13 is tied in common to the memory inputs of X memories 10*c* and 10*s*, while input voltages $\cos x_a$ and $\sin x_a$ are supplied respectively to the — inputs of comparators 40*c* and 40*s*. At the instant a comparison is obtained, the + and — inputs to the comparators are equal. Hence, $\cos D=\cos x_a$ and $\sin D=\sin x_a$. The value of the ramp voltage D acquired in storage at the instant of comparison is, therefore, $x_a$, that is, the angle whose cosine or sine is equal respectively to the input to the — terminal of comparator 40*c* or 40*s***, as shown in FIG. 7.

Figures 8, 10:
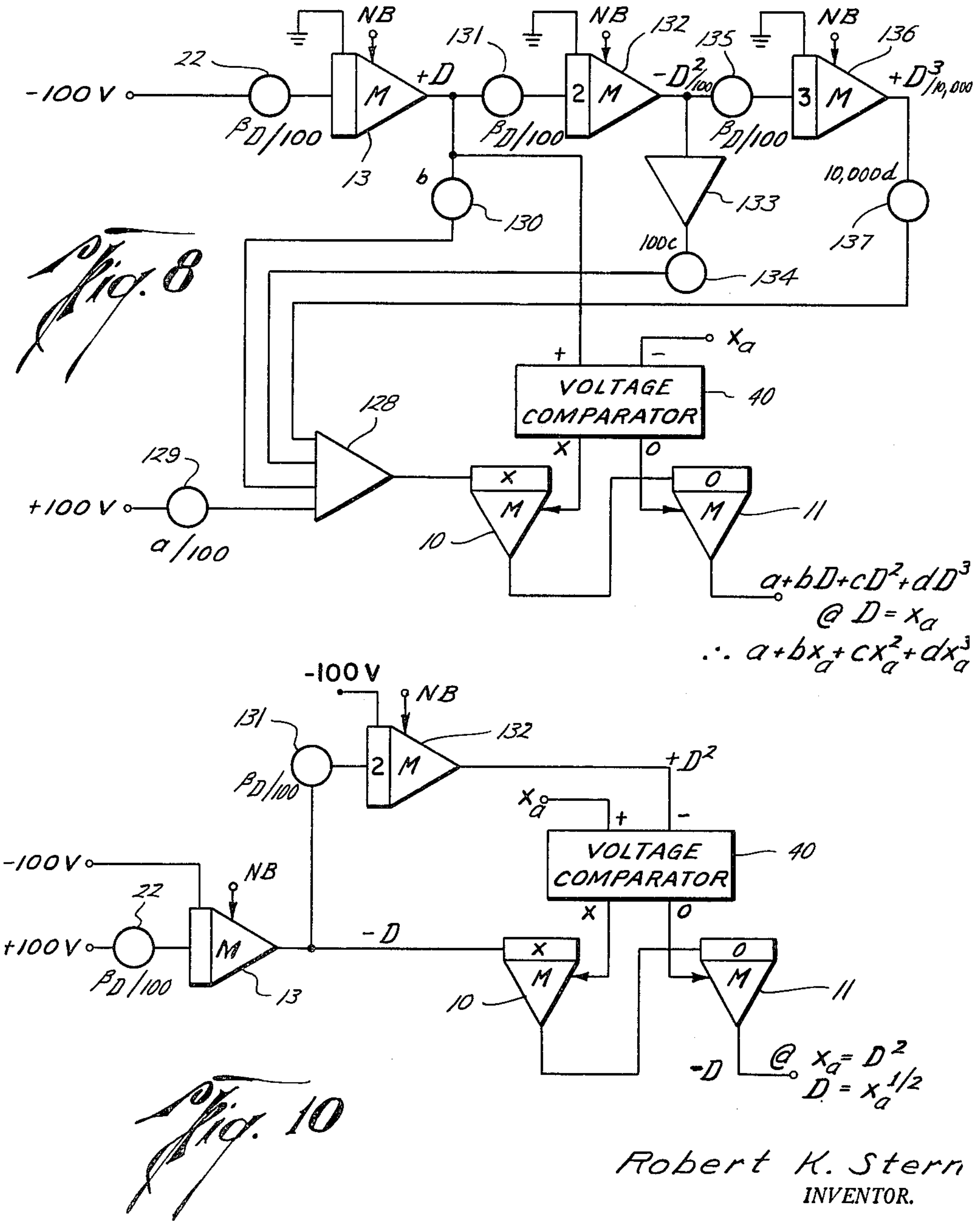
FIG. 8 is a schematic diagram of an analog computing system arranged for generating a polynomial.
FIG. 10 is an analog computing system arranged for generating the square root of a variable.

In FIG. 8 is shown a computer arrangement adapted for generation of a function expressed in the general form $a+bx_a+cx_a^2+dx_a^3$ utilizing one forward memory unit in common to provide both the ramp +D to the voltage comparator and the same ramp multiplied by a potentiometer factor *b* via a summer 128 to the memory input of the X memory unit 10. Where the input variable voltage $x_a$ is always positive, the ramp generating memory unit 13 may have its reset input terminal grounded, as shown.

More particularly, a potentiometer 129 having a +100 volts applied across it supplies a voltage $+a$ to one input terminal of summer 128. Potentiometer 130 coupling the output of memory unit 13 to another input terminal of summer 128 supplies thereto the voltage *b*D. To obtain the second power term, a potentiometer 131 also connected to the output of memory unit 13 introduces the same integrating factor $\beta_D/100$ as does potentiometer 22 and couples the resulting voltage to the normal input of memory unit 132 which is thus arranged in a manner substantially identical to memory unit 13. The $-D^2$ output of memory unit 132 is supplied via inverter 133 and potentiometer 134 to a third input terminal of summer 128 to apply thereto the voltage $+cD^2$. In a similar fashion additional powers may be obtained, the cubic, for example, by potentiometer 135 and memory unit 136, the output of which is coupled via potentiometer 137 to a fourth input of the summer 128. The negative output of summer 128 is then tracked and stored in memory by the X and O memory units 10 and 11 to yield an output at the instant of comparison which is a negative of $a+bx_a+cx_a^2+dx_a^3$.

Figure 9:
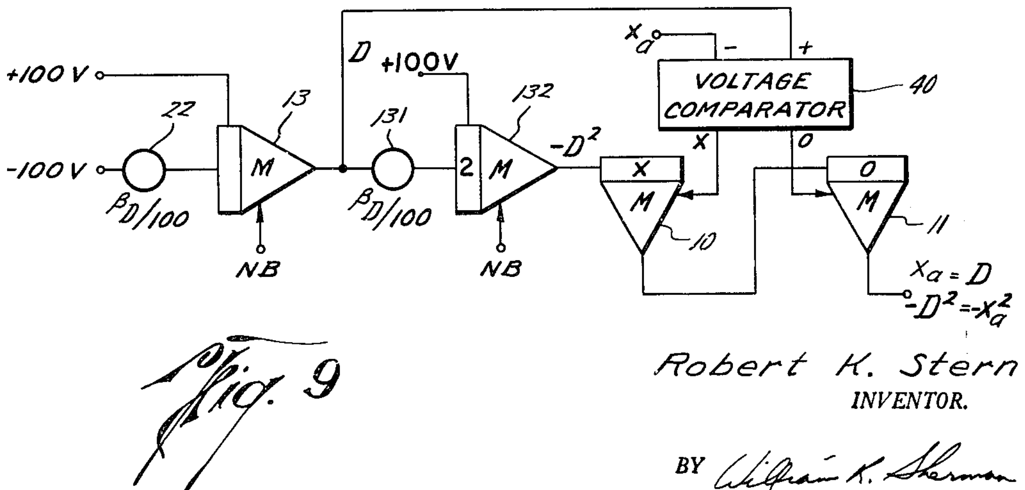
FIG. 9 is a schematic diagram of an analog computing system arranged for generating the square of a variable.

The technique of comparing two variables to obtain a third can also be used for the generation of a variety of functions represented by a variable raised to a power. In FIG. 9, for example, the output from the X and O memory units 10 and 11 is equal to the square of the variable input voltage $x_a$ applied to the — terminal of the comparator 40. This results from application of the voltage ramp D obtained again from memory unit 13 to the + terminal of the comparator and, as in FIG. 8, via potentiometer 131 and forward memory unit 132, here directly to the memory input of X memory unit 10. At the instant of comparison, $D=x_a$ and the negative output voltage $D^2-x_a^2$.

Similarly, the inverse function can be obtained by reversing application of the ramp D and voltage $D^2$, as in FIG. 10. Like the circuit of FIG. 9, a machine voltage limit of + or — 100 volts limits the circuit to handling an input $x_a$ of + or −100 volts, or in the case of FIG. 10 from zero to +100 volts. Of course, the slope of the ramp D may be changed correspondingly. Also, in FIG. 10 it is desirable to reverse the input connections to the voltage comparator 40 since the voltage $+D^2$ will initially exceed any value of the input voltage $x_a$. Otherwise, the operation will be understood from the discussion given in connection with the preceding figure.

Figure 11:
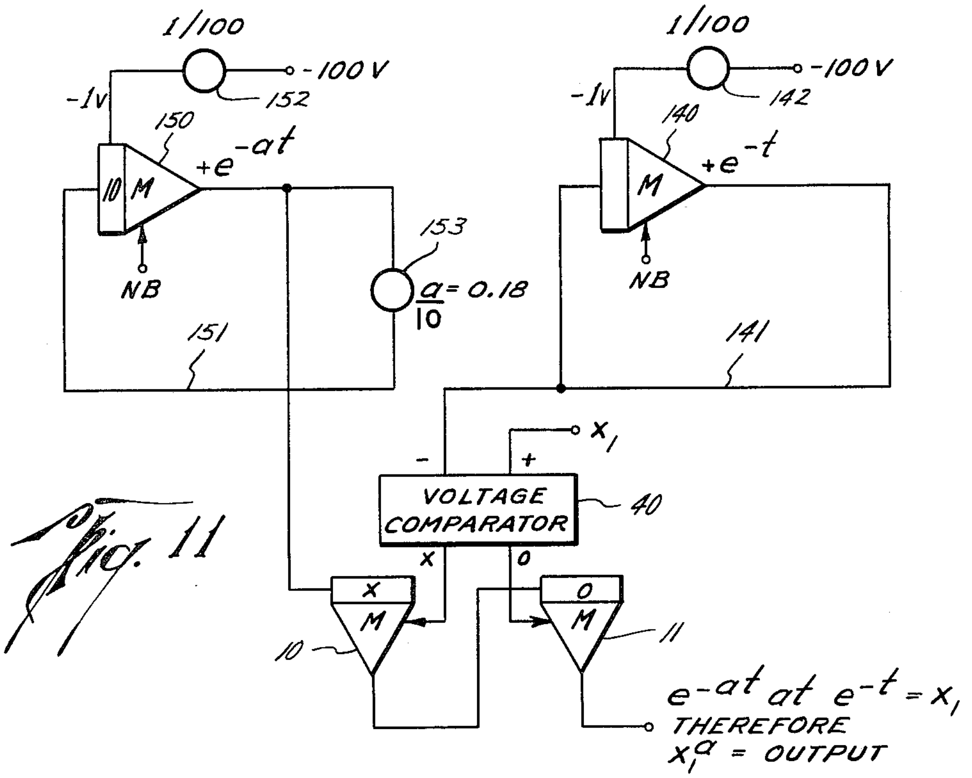
FIG. 11 is a schematic diagram of an analog computing system arranged for generating a function which is a variable raised to a constant power.

In FIG. 11 provision is made for generating an output voltage representing the input variable $x_1$ raised to any convenient constant power "$a$," such as 1.80. This is accomplished by applying the input variable $x_1$ (which may be limited to + or −1 volt) to the + terminal of the comparator 40 and by applying a voltage representing $+e^{-t}$ to the − terminal, using an initial condition output voltage of +1 volts to insure proper operation of the comparator. This is obtained using a forward memory unit 140 having a lead 141 providing a closed loop from its output to its normal input for unity loop gain. Utilizing potentiometer 142 across which is connected a −100 volts, there is applied a −1 volt to the memory input of unit 140. Hence, since the integral of $e^{-t}$ is $-e^{-t}$, the closed loop at 141 constrains the memory unit 140 to generate this output $+e^{-t}$ during each operate interval.

Correspondingly, a memory unit 150 provided with closed loop 151 and memory input potentiometer 152 generates an exponential function of time $t$. However, to introduce the constant "$a$," a potentiometer 153 set at this value is connected in the loop 151. The output voltage $+e^{-at}$ derived from memory unit 150 is then applied to the memory input of X memory unit 10 for readout in each subsequent repetitive cycle by the O memory unit 11. At the instant of comparison, $x_1=e^{-t}$ and substituting this into the function applied to the X memory input, the output becomes $x_1^{a}$.

Figure 12:
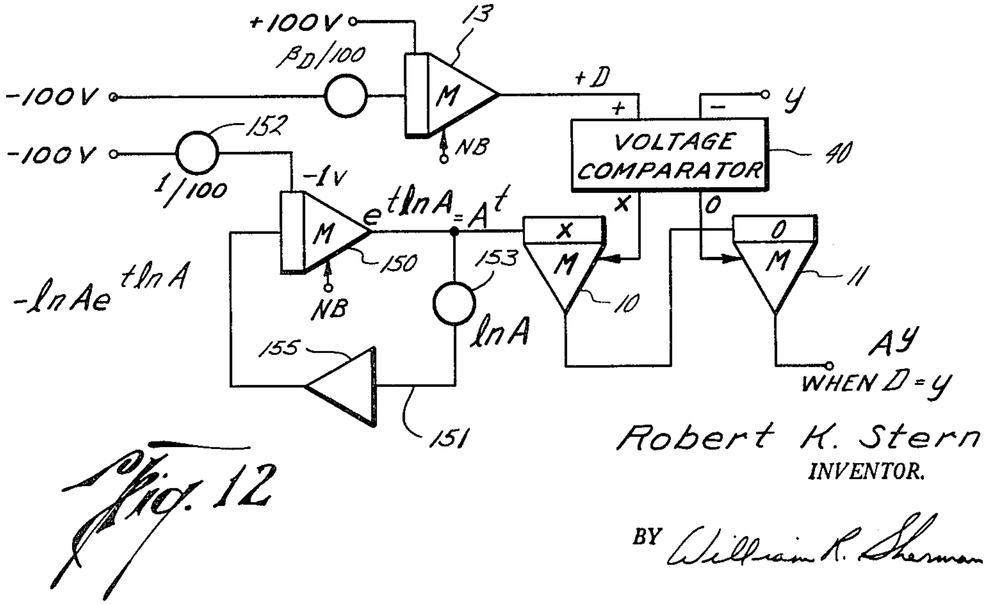
FIG. 12 is a schematic diagram of an analog computing system arranged for generating a function which is a constant raised to a variable power.

In FIG. 12, the analog computer is arranged in accordance with the present invention to derive a voltage $A^y$ where the input is a variable voltage $y$. In the same manner as in FIG. 1, the ramp +D is supplied to the + terminal of voltage comparator 40 and, in this case, the variable voltage $y$ is applied to the − terminal. To provide an appropriate voltage to the tracking and storing memory units 10 and 11, the forward memory unit 150 is connected as in FIG. 11 except that the potentiometer 153 is set to represent the logarithm of the constant A for the natural base $e$ and is connected in series in loop 151 with an inverter 155.

The loop circuit formed with respect to the output and normal input circuits of the forward memory unit 150 thereby constrains the output of such unit during each operate cycle to represent a function $e^{t \ln A}=A^t$. By suitably adjusting the slope of the ramp D, D may be made equal to the time factor $t$ in this expression, whereby upon the occurrence of a comparison, $y=t$ and the output is $A^y$.

Various additional examples could of course be given of techniques for generating functions utilizing the principles of the present invention. It is seen, however, that a high degree of versatility is afforded whereby a general purpose analog computer arranged in accordance with the present invention may be utilized in a wide variety of problems.

While the invention has been exemplified by an uninterrupted sequence of reset and operate intervals differing by one or two orders of magnitude, the relative duration of the reset interval may be lengthened or preferably shortened, and provision may be made for desired overlap or underlap of the respective intervals, as may best suit the particular memory units or applications at hand. Furthermore, while the exemplary embodiments are characterized by repetitive operation of fixed iterative or cyclic rate, such as would generally be of practical utility, the invention is not necessarily restricted in this respect but contemplates a variable frequency timing wave available in common to a plurality of operational amplifiers programmed for repetitive operation or, if desired, a plurality of timing waves of different frequency or other characteristic applied to respective ones or groups of such amplifiers. Of course, more than one X or O memory or sets of X and O memories may be subject to the control signals from a single voltage comparator.

In some instances, it may be desirable to accomplish high speed switching within the computer problem setup at the instant of a voltage comparison without integration.

A voltage comparator having a signal applied to one of its input terminals of the type provided by amplifier unit 13 may control the electronic switch of a similar amplifier unit through connection of its control input to either the X or O comparator terminal, where such amplifier unit differs in the omission of the integrating capacitor. With this modification, the output of the modified amplifier unit can be switched with high rapidity and accuracy from a voltage corresponding to the normal input to a voltage corresponding to the input applied to the reset or memory input terminal at the instant a comparison is effected.

With regard to the circuitry of the memory units, high speed or electronic switching may be accomplished outside, as well as inside the computing amplifier feedback loop. The switches may be adapted for actuation by any type of waveform, e.g., pulse, sinusoidal, sawtooth, stepped, etc. However, for precise timing, sharp leading and trailing edges corresponding to the reset and operate intervals are desirable.

By suitable switch arrangements, a single or common timing wave may be operative to transfer the switch of one memory unit from the tracking to the hold mode and the differently conditioned switch of another memory unit from the hold to the tracking mode. For example, such switches may have a selectively operable sign inverting input stage by which the memory units may be conditioned as forward or reverse, or X or O. In addition, the switches may incorporate delayed opening or closing, as desired.

In some problem setups, different groups of memory units may be programmed at different repetitive operation rates, and some in real time. The speed of capacitor recharging upon switching to the tracking or resetting mode may be increased, if desired, by using as a coupling circuit at the memory input terminal a capacitor in parallel with memory input resistor 28 and having a capacitance substantially equal to the time constant of the reset circuit divided by resistance 28.

The invention is, of course, susceptible to various other modifications and additions. Accordingly, the invention is not intended to be restricted to the embodiments illustrated and described but is of a scope defined in the appended claims.

I claim:

1. An analog computer comprising at least one amplifier unit including an operational amplifier, an integrating capacitor charged thereby to develop an output voltage, and an impedance arranged in a degenerative feedback loop between the output and input of said amplifier, switch means responsive to a control signal for selectively completing said feedback loop from said impedance to the amplifier input, and impedance transforming means responsive to the output voltage of said amplifier via said impedance and to a first input voltage for supplying the difference thereof to the amplifier input at a low impedance when said feedback loop is completed, a voltage comparator having a pair of inputs and responsive to the relative magnitude of second and third input voltages applied thereto for supplying a control signal to said switch means to complete said feedback loop when one of said second and third input voltages exceeds the other, and means for supplying said first and second input voltages with a mathematical relationship therebetween whereby one of said voltages varies as a function of the other of said voltages.

2. An analog computer in accordance with claim 1 wherein one of said first and second voltages is the product of the other and of a voltage representing a variable input.

3. An analog computer as defined in claim 1 wherein one of said first and second voltages varies as a trigonometric function of the other of such voltages.

4. An analog computer as defined in claim 1 wherein one of said first and second input voltages represents a polynomial expansion of the value represented by the other of such voltages.

5. An analog computer as defined in claim 1 wherein one of said first and second input voltages varies as a power other than the first power of the other of such voltages.

6. An analog computer as defined in claim 1 wherein said means for supplying said first and second input voltages includes at least one of said amplifier units and means for completing a feedback loop between its output and the input of its operational amplifier.

7. An analog computer comprising at least two operational amplifier memory units having tracking and storing modes and responsive to a control signal for switching between said modes, means for coupling said memory units in cascade, and means for supplying a control signal to each of said memory units for switching the first of said memory units from a first of said modes to the second at spaced time intervals, and from said second mode to said first mode at variably spaced alternate time intervals, and for switching the second of said memory units at such times between the converse modes.

References Cited by the Examiner

UNITED STATES PATENTS

| | | | |
|---|---|---|---|
| 2,891,725 | 6/1959 | Blumenthal et al. | 235—183 |
| 2,905,876 | 9/1959 | Hillman. | |
| 2,967,018 | 1/1961 | Fogarty | 235—194 |
| 3,002,690 | 10/1961 | Meyer | 235—183 |
| 3,008,094 | 11/1961 | Trimmer | 235—183 X |
| 3,016,197 | 1/1962 | Newbold | 235—197 X |

OTHER REFERENCES

Pages 1540–1544, September 1960, Andrews, "The Dynamic Storage Analog Computer—DYSTAC," Instruments and Control Systems.

Pages 1545–1549, September 1960, Gilliland et al., "Use of Analog Memory for Simulation of a Melting Slab," Instruments and Control Systems.

Page 289, February 1960, Instruments and Control Systems.

MALCOLM A. MORRISON, *Primary Examiner.*

WALTER W. BURNS, Jr., *Examiner.*